United States Patent
Wang et al.

(10) Patent No.: US 11,770,823 B2
(45) Date of Patent: Sep. 26, 2023

(54) UPLINK TRANSMISSION METHOD AND USER EQUIPMENT

(71) Applicant: HUAWEI TECHNOLOGIES CO., LTD., Guangdong (CN)

(72) Inventors: Lei Wang, Shanghai (CN); Yan Chen, Shanghai (CN); Yiqun Wu, Shanghai (CN); Xiaomeng Chai, Shanghai (CN); Xiuqiang Xu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 186 days.

(21) Appl. No.: 17/094,198

(22) Filed: Nov. 10, 2020

(65) Prior Publication Data
US 2021/0068132 A1    Mar. 4, 2021

Related U.S. Application Data (63) Continuation of application No. PCT/CN2019/085698, filed on May 6, 2019.

(30) Foreign Application Priority Data

May 11, 2018   (CN) .......................... 201810451455.3

(51) Int. Cl.
*H04W 72/1268*   (2023.01)
*H04W 56/00*    (2009.01)
*H04W 74/08*    (2009.01)

(52) U.S. Cl.
CPC ... *H04W 72/1268* (2013.01); *H04W 56/0045* (2013.01); *H04W 74/0833* (2013.01)

(58) Field of Classification Search
None
See application file for complete search history.

(56) References Cited

U.S. PATENT DOCUMENTS 8,411,664 B2 *   4/2013   Tynderfeldt ...... H04W 56/0005
                                              370/350
8,717,985 B2 *   5/2014   Du ..................... H04W 74/006
                                              370/329
(Continued)

FOREIGN PATENT DOCUMENTS

CN    102651907 A    8/2012
CN    103069896 A    4/2013
(Continued)

OTHER PUBLICATIONS

Intel Corporation, NR random access procedure. 3GPP TSG RAN WG1 #88bis, Spokane, USA, Apr. 3-7, 2017, R1-1706172, 8 pages.
(Continued)

*Primary Examiner* — Gregory B Sefcheck
(74) *Attorney, Agent, or Firm* — WOMBLE BOND DICKINSON (US) LLP (57) ABSTRACT

An uplink transmission methods and apparatuses to reduce a probability that a collision between a user equipment (UE) and another UE occurs when the UE sends uplink data, thereby improving network performance are described. A plurality of different preamble signals are sent to a network device by a user equipment (UE). A feedback signal of the network device in response to the plurality of preamble signals is received by the UE. The feedback signal in response to each preamble signal carries a timing advance (TA) corresponding to the preamble signal. A valid TA is determined by the UE from the plurality of received TAs. A parameter used for uplink transmission is determined by the UE based on a feedback signal carrying the valid TA or a preamble signal corresponding to the valid TA. Uplink data are sent according to the parameter by the UE.

20 Claims, 4 Drawing Sheets

(56) References Cited

U.S. PATENT DOCUMENTS

| | | | |
|---|---|---|---|
| 8,995,372 B2* | 3/2015 | Kwon | H04W 56/0045 370/329 |
| 10,250,362 B2* | 4/2019 | Marinier | H04W 72/02 |
| 10,314,079 B2* | 6/2019 | Kim | H04W 56/0045 |
| 10,798,684 B2* | 10/2020 | Marinier | H04W 52/146 |
| 10,813,137 B2* | 10/2020 | Shih | H04W 74/0833 |
| 10,952,242 B2* | 3/2021 | Tsai | H04L 5/0091 |
| 11,076,422 B2* | 7/2021 | Chen | H04W 72/0446 |
| 11,140,716 B2* | 10/2021 | Ohlsson | H04W 76/11 |
| 11,172,510 B2* | 11/2021 | Sahlin | H04W 74/0833 |
| 2011/0103499 A1* | 5/2011 | Cheng | H04W 56/0045 455/517 |
| 2011/0170535 A1* | 7/2011 | Wang | H04W 56/0045 370/350 |
| 2012/0307811 A1* | 12/2012 | Kwon | H04W 74/0833 370/336 |
| 2013/0003682 A1* | 1/2013 | Jiang | H04W 56/0045 370/328 |
| 2013/0021979 A1 | 1/2013 | Kwon et al. | |
| 2014/0362794 A1* | 12/2014 | Zhao | H04W 56/0045 370/329 |
| 2015/0131426 A1* | 5/2015 | Wan | H04W 74/0833 370/329 |
| 2015/0230194 A1* | 8/2015 | Yang | H04L 5/0051 370/337 |
| 2015/0327198 A1* | 11/2015 | Axmon | H04W 56/0045 370/336 |
| 2016/0044619 A1* | 2/2016 | Ryu | H04W 72/042 370/350 |
| 2016/0165490 A1* | 6/2016 | Nagasaka | H04L 5/0035 370/331 |
| 2018/0014331 A1* | 1/2018 | Karout | H04W 74/006 |
| 2018/0084546 A1* | 3/2018 | Guo | H04W 56/0045 |
| 2018/0124724 A1* | 5/2018 | Tsai | H04W 74/0833 |
| 2018/0198665 A1* | 7/2018 | Guo | H04W 56/0055 |
| 2018/0234854 A1* | 8/2018 | Zhang | H04L 5/26 |
| 2019/0053120 A1* | 2/2019 | Park | H04W 36/305 |
| 2019/0215792 A1* | 7/2019 | Ye | H04L 45/20 |
| 2019/0254064 A1* | 8/2019 | Islam | H04W 74/0883 |
| 2019/0274169 A1* | 9/2019 | Tsai | H04W 56/0045 |
| 2019/0281639 A1* | 9/2019 | Yang | H04W 72/0406 |
| 2020/0128587 A1* | 4/2020 | Qian | H04W 8/24 |
| 2020/0383147 A1* | 12/2020 | Yoon | H04L 27/2607 |
| 2021/0068132 A1* | 3/2021 | Wang | H04W 72/04 |
| 2021/0219255 A1* | 7/2021 | Zhang | H04L 5/0051 |
| 2022/0304077 A1* | 9/2022 | Liu | H04W 74/0833 |

FOREIGN PATENT DOCUMENTS

| | | |
|---|---|---|
| CN | 104039007 A | 9/2014 |
| CN | 104396280 A | 3/2015 |
| CN | 107995636 A | 5/2018 |
| WO | 2013051989 A1 | 4/2013 |
| WO | 2017044155 A1 | 3/2017 |

OTHER PUBLICATIONS

Huawei, HiSilicon, Impact of Multi-beam operations to Power Ramping for RACH. 3GPP TSG-RAN WG2 NR Ad Hoc Qingdao, China, Jun. 27-29, 2017, R2-1706462, 3 pages.

ZTE, Sanechips, Remaining details of RACH procedure. 3GPP TSG RAN WG1 Meeting #91, Reno, USA, Nov. 27 Dec. 1, 2017, R1-1719346, 30 pages.

* cited by examiner

UPLINK TRANSMISSION METHOD AND USER EQUIPMENT

CROSS-REFERENCE TO RELATED APPLICATIONS

This application is a continuation of International Application No. PCT/CN2019/085698, filed on May 6, 2019, which claims priority to Chinese Patent Application No. 201810451455.3, filed on May 11, 2018. The disclosures of the aforementioned applications are hereby incorporated by reference in their entireties.

TECHNICAL FIELD

The application relates to communication technologies, and in particular, to an uplink transmission method and user equipment.

BACKGROUND

In a wireless communications system, there may be collision between uplink transmission of user equipment (UE) and uplink transmission of another UE. For example, a collision occurs when multiple UEs send a same random access preamble sequence on a same time-frequency resource.

In LTE, the collision between UEs may be resolved by a conflict resolution process in a random access process. In the random access process, the first step is that UE sends a message 1 (Msg 1), where the Msg 1 is a random access preamble preamble. The second step is that: After detecting the preamble, a base station sends a message 2 (Msg 2), that is, a random access response (RAR), where the Msg 2 carries a timing advance (TA) and grant information used by the UE to send a message 3 (Msg 3). The third step is that the UE sends the Msg 3 on a corresponding resource based on received grant information, where the Msg 3 carries an identifier of the UE. The fourth step is that the base station sends a message 4 (Msg 4) after receiving the Msg 3, where the Msg 4 carries the identifier of the UE in the Msg 3 sent in the third step, to perform contention resolution. If multiple UEs perform random access by using a same preamble on a same time-frequency resource, Msg 3 and Msg 4 are sent to resolve a conflict. For example, UE A and UE B simultaneously send a Msg 3 on a same resource, and the Msg 3 includes an identifier of the corresponding UE. If the base station returns the identifier of the UE (for example, UE A) in the Msg 4 after receiving the Msg 3, only the UE whose identifier is returned successfully accesses the network.

$5^{th}$ Generation (5G) is a popular standard for next-generation cellular communications networks, and massive connections are a focus in a massive machine-type communication (mMTC) scenario. In a scenario in which a large quantity of UEs need to access a network, there is a higher probability that a collision occurs when a plurality of UEs perform random access. If a conflict resolution solution in the LTE is used, the collision still occurs among a plurality of UEs when a Msg3 is sent, and network access performance of the UEs is affected. In the mMTC scenario, there are a large number of UEs and uplink access is frequent. Therefore, the collision problem severely affects network performance.

SUMMARY

The application provides an uplink transmission method and user equipment to reduce a probability that a collision occurs during uplink data transmission, thereby improving network performance.

In at least one embodiment, an uplink transmission method includes: sending, by UE, a plurality of different preamble signals to a network device; receiving, by the UE, a feedback signal of the network device in response to the plurality of preamble signals, where the feedback signal in response to each preamble signal carries a TA corresponding to the preamble signal; determining, by the UE, a valid TA from the received TAs; determining, by the UE based on a feedback signal carrying the valid TA or a preamble signal corresponding to the valid TA, a parameter used for uplink transmission; and sending, by the UE, uplink data according to the parameter.

In at least one embodiment, a user equipment includes a sending unit, a receiving unit, and a processing unit. The sending unit sends a plurality of different preamble signals to a network device; the receiving unit receives a feedback signal of the network device in response to the plurality of preamble signals, where the feedback signal in response to each preamble signal carries a TA corresponding to the preamble signal; the processing unit determines, based on a feedback signal carrying the valid TA or a preamble signal corresponding to the valid TA, a valid TA from the plurality of received TAs and a parameter used for uplink transmission, and further processes uplink data based on the parameter to obtain an uplink signal; and the sending unit sends the uplink signal.

In at least one embodiment, a user equipment includes a transmitter, a receiver, a memory, and a processor, where the memory is configured to store a computer program, and the processor executes the computer program to implement the uplink transmission method as described herein.

In at least one embodiment a storage medium is configured to store a computer program, and the computer program is used to implement the uplink transmission method as described herein.

According to the asynchronous uplink transmission method, the equipment, and the storage medium that are provided in the application, UE sends a plurality of preamble signals to a network device, to obtain a plurality of TAs fed back by the network device for the plurality of preamble signals, and determines a valid TA from the plurality of TAs, determines, based on a feedback signal carrying the valid TA or a preamble signal corresponding to the valid TA, a parameter used for uplink transmission, and sends uplink data according to the parameter. When a preamble signal sent by UE A collides with a preamble signal sent by another UE, the network device cannot distinguish UE from which the network device currently receives the preamble signal. In this case, a calculated TA may not be a real TA of the UE A, and the TA is an invalid TA for the UE A. When the preamble signal sent by the UE A does not collide with a preamble signal sent by another UE, a TA fed back by the network device for the preamble signal sent by the UE A is the valid TA for the UE A. The UE determines, by obtaining the valid TA, sent preamble signals that do not collide with the preamble signal sent by the another UE, and then transmits uplink data by using a parameter used for uplink transmission and corresponding to the preamble signals that do not collide with the preamble signal sent by the another UE. Because a preamble signal sent by the UE does not collide with the preamble signal sent by the another UE, a probability that a transmission parameter corresponding to the preamble signal is used by the another UE to transmit uplink data is low. Therefore, when the UE transmits the uplink data by using the transmission parameter, a probability that the UE collides with the another UE is very low.

DESCRIPTION OF EMBODIMENTS

Figure 1:
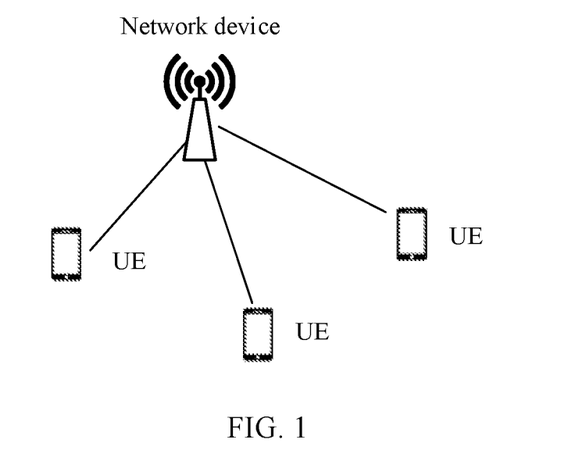
FIG. 1 is a schematic diagram of a communications system according to an embodiment of the application.

An uplink transmission solution provided in the application may be applied to a wireless communications system, for example, in a new radio (NR) scenario, a long term evolution (LTE) next-generation scenario, a wireless local area network (WLAN) scenario, a Bluetooth communication scenario, and the like. For ease of description, the new radio scenario is used as an example for description in the embodiments of the application. FIG. 1 is a schematic diagram of a communications system according to an embodiment of the application. As shown in FIG. 1, a new radio access network may be included in an NR scenario, and function entities in the NR scenario are mainly a network device and user equipment that communicates with the network device in the new radio access network, and may further include a relay device and user equipment connected to the relay device. The relay device establishes a connection to the network device. Therefore, for the network device, the relay device may also be considered as user equipment. The relay device establishes a connection to the user equipment. Therefore, for the user equipment, the relay device may also be considered as a network device. Therefore, one of ordinary skill in the art may understand that the network device described in the application may also be the relay device, and the user equipment described in the application may also be the relay device. The network device may be any one of or a combination of several of a gNB, a new radio eNB, a transmission and reception point (TRP), a macro base station, a micro base station, a high frequency base station, an LTE macro or micro eNB, a CPE, a WLAN AP, and the like. For example, the network device may be the gNB, and the gNB implements a function related to the network device in the application. Alternatively, the network device is a combination of the gNB and the TRP. For example, the gNB implements a resource configuration function of the network device in the application, and the TRP implements sending and receiving functions of the network device in the application. The application is not limited thereto. The user equipment may be a mobile phone, a tablet, an intelligent vehicle, a sensing device, an internet of things (IoT) device, a customer premises equipment (CPE), a relay base station, and the like.

Figure 2:
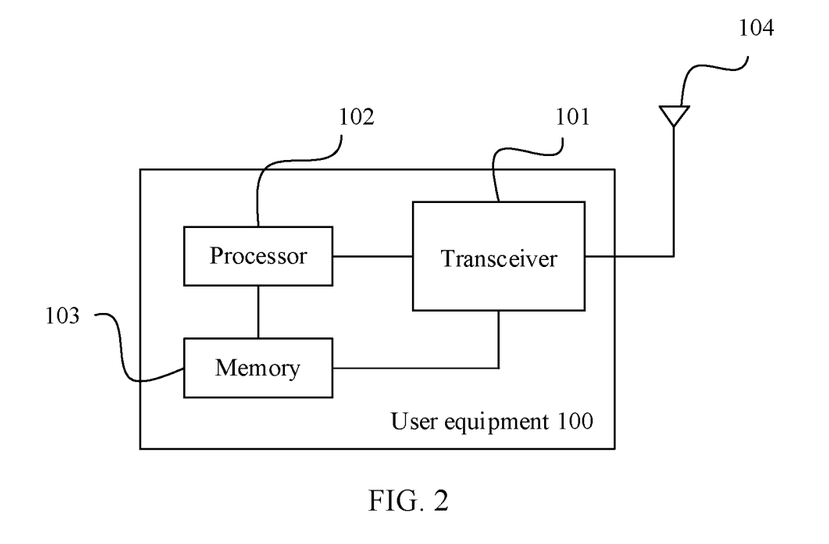
FIG. 2 is a schematic structural diagram of user equipment according to an embodiment of the application.

For the user equipment and the network device in the application, the user equipment is a UE that supports a next-generation mobile communications standard, for example, 5G UE), or another 5G terminal device. FIG. 2 is a schematic structural diagram of user equipment according to an embodiment of the application. As shown in FIG. 2, a user equipment 100 may include one or more transceivers 101, one or more antennas 104, one or more processors 102, and one or more memories 103. The user equipment performs a method performed by the user equipment in any embodiment provided in the application.

Figure 3:
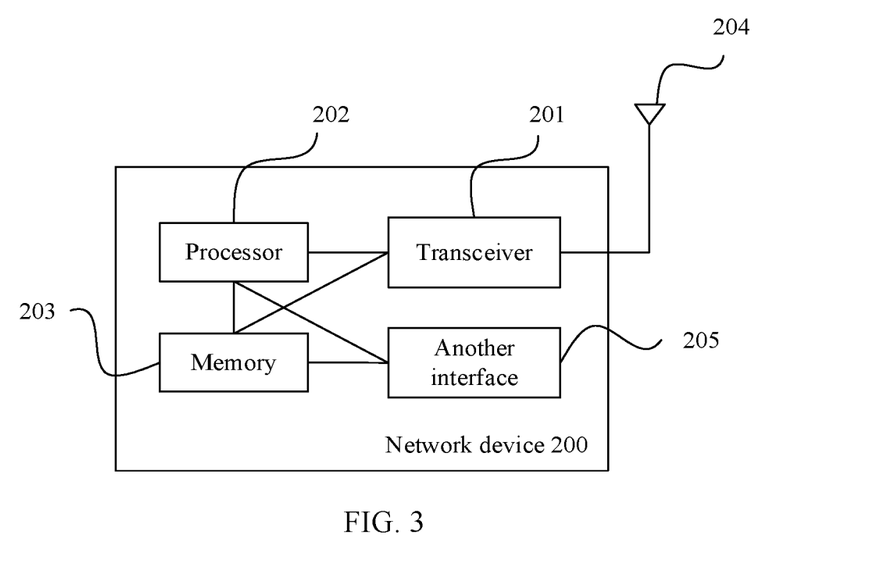
FIG. 3 is a schematic structural diagram of a network device according to an embodiment of the application.

The network device is a base station in a next-generation mobile communications network, for example, a 5G gNB, a transmission and reception point (TRP), or a network device (e.g., a micro base station) in another 5G access network. FIG. 3 is a schematic structural diagram of a network device according to an embodiment of the application. As shown in FIG. 3, a network device 200 may include one or more transceivers 201, one or more antennas 204, one or more processors 202, and one or more memories 203. Further, one or more other interfaces 205 (for example, an optical fiber link interface, an Ethernet interface, and/or a copper wire interface) may also be included. The network device can perform a method performed by the network device described in any embodiment provided in the application.

In the application, to reduce a probability that UE collides with another UE during uplink transmission, the UE sends a plurality of different preamble signals, receives a feedback signal of the network device in response to the plurality of preamble signals, where the feedback signal in response to each preamble signal carries a TA determined based on the preamble signal, determines, based on the TA carried in the received feedback signal, sent preamble signal that do not collide with a preamble signal sent by the another UE, and then transmits uplink data by using a transmission parameter corresponding to the preamble signals that do not collide with the preamble signal sent by the another UE. Because a preamble signal sent by the UE does not collide with the preamble signal sent by the another UE, a probability that the transmission parameter corresponding to the preamble signal is used by the another UE to transmit the uplink data is also low. Therefore, when the UE transmits the uplink data by using the transmission parameter, a probability that the UE collides with the another UE is low.

Figure 4:
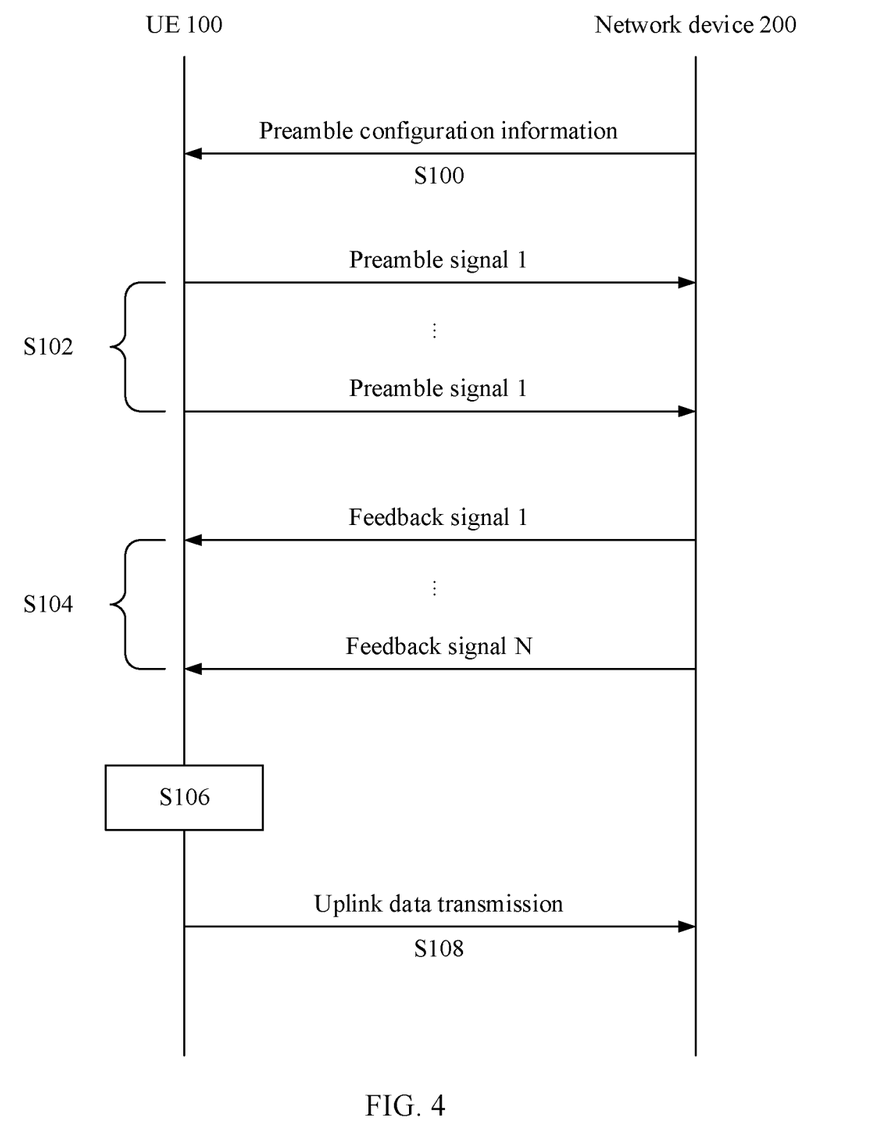
FIG. 4 is a schematic interaction diagram of an uplink transmission method according to an embodiment of the application.

With reference to FIG. 4, the following describes an uplink transmission method provided in the application. It should be noted that names of indications or parameters between devices in the following embodiments of the application are merely examples, and may be other names in specific implementation. A general description is provided herein, and this is not limited in the embodiments of the application.

Operation S100. UE 100 receives preamble configuration information sent by a network device 200.

In this operation, the network device 200 periodically or aperiodically broadcasts the preamble configuration information to UE in a cell in which the network device 200 is located. The preamble configuration information includes configuration information of a time-frequency resource set used to send a preamble signal and parameter configuration information used to generate a preamble sequence. In the application, the preamble signal is a signal that may be predetermined by the network device, for example, a physical random access channel (PRACH) preamble signal.

In an embodiment, the parameter configuration information used to generate the preamble sequence includes: a parameter used to generate a root sequence, a cyclic shift value or an index of a cyclic shift value, and a type parameter (e.g., a parameter indicating whether a preamble sequence set is a non-limited set or a limited set) of a preamble sequence set.

Operation S102. The UE 100 sends a plurality of different preamble signals to the network device 200, for example, N preamble signals, which are a preamble signal 1, . . . , and a preamble signal N, where N is an integer greater than or equal to 2.

The UE 100 may generate a plurality of preamble sequences (for example, 64 preamble sequences) based on the parameter configuration information used to generate the preamble sequences, and the plurality of preamble sequences form a preamble sequence set. The UE 100 maps any preamble sequence in the preamble sequence set to any time-frequency resource in the time-frequency resource set, to generate a preamble signal. In the application, a preamble sequence used to generate a preamble signal is referred to as a preamble sequence of the preamble signal, and a time-frequency resource to which the preamble sequence is mapped is referred to as a time-frequency resource occupied by the preamble signal. For a preamble sequence generation method, refer to a preamble sequence generation method in the prior art, for example, a preamble sequence generation method in an existing communications protocol 3GPP TS38.211 or 3GPP TS36.211. This is not limited in the application.

In an embodiment, the UE 100 sends N different preamble signals. For example, the UE 100 may use N different preamble sequences to generate N different preamble signals, or may map the N preamble sequences to N different time-frequency resources to generate the N different preamble signals. In the application, different time-frequency resources may refer to different time domain resources, may refer to frequency domain resources, or may refer to different time domain resources and different frequency domain resources.

The UE 100 may randomly select, from the time-frequency resource set configured by using the preamble configuration information, the time-frequency resource used to map a pilot sequence, or may select, according to a rule, the time-frequency resource used to map the pilot sequence. The rule may be specified by a communications protocol, or may be configured by the network device. A rule to be used is not limited in the application.

A quantity of preamble signals (e.g., a value of N) is determined by the UE 100. An objective of sending the plurality of preamble signals by the UE 100 is to obtain a plurality of TAs fed back by the network device 200 for the plurality of preamble signals, and find a valid TA from the plurality of TAs. Therefore, when the UE 100 has determined that the plurality of currently received TAs include a valid TA, the UE 100 may stop sending the preamble signal.

It should be noted that FIG. 4 merely shows that N preamble signals are sent, but it is not limited that the N preamble signals are sent in sequence. In an embodiment, if the UE 100 maps the N different preamble sequences to a same time-frequency resource when generating the N preamble signals, a sequence of sending the N preamble signals is not limited.

Operation S104. The UE 100 receives a feedback signal of the network device 200 in response to the N preamble signals.

The network device 200 detects all possible preamble signals on an available time-frequency resource used for preamble signal transmission. If a preamble signal is successfully detected on a time-frequency resource, the network device 200 calculates a TA corresponding to the preamble signal, and sends the feedback signal. For example, after successfully detecting a preamble signal 1, . . . , and a preamble signal N, the network device 200 sends feedback signals for the N preamble signals.

In an embodiment, the network device 200 may separately send one feedback signal for each detected preamble signal. As shown in FIG. 4, for the preamble signal 1, . . . , and the preamble signal N, the network device 200 respectively sends a feedback signal 1, . . . , and a feedback signal N, where a feedback signal i is a feedback signal for a preamble signal i, where i=1, . . . , N.

Figure 5:
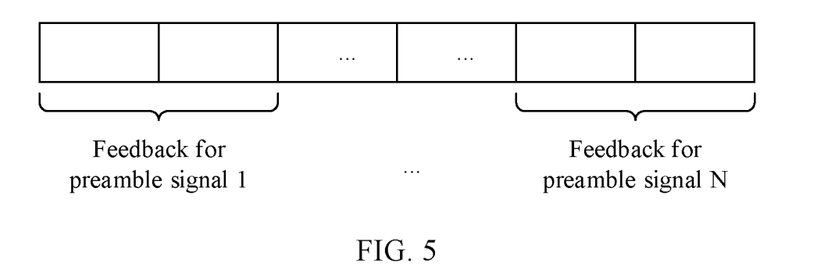
FIG. 5 is a schematic structural diagram of a feedback signal according to an embodiment of the application.

In another embodiment, the network device 200 may send only one group common (Group Common) feedback signal for a plurality of detected preamble signals. The group common feedback signal carries feedback for the plurality of preamble signals. For example, the group common feedback signal includes a plurality of fields. As shown in FIG. 5, the feedback for each preamble signal occupies one field or a group of fields, and feedbacks for different preamble signals occupy different fields.

If the network device 200 sends a separate feedback signal for each detected preamble signal, the separate feedback signal carries a TA value corresponding to the preamble signal. For example, the feedback signal i in FIG. 4 carries a $TA_i$ corresponding to the preamble signal i. If the network device 200 sends only one group common feedback signal for a plurality of detected preamble signals, the group common feedback signal carries TAs, for example, $TA_i$, . . . , and $TA_N$, separately corresponding to the plurality of preamble signals. In another embodiment, the network device may feed back a plurality of TAs for a preamble signal.

In addition to feeding back a TA corresponding to each detected preamble signal, the network device 200 may further use a same feedback signal to carry a sequence number or an index of a preamble sequence of the preamble signal, and/or information indicating a time-frequency resource occupied by the preamble signal, and/or parameter configuration information used for uplink data transmission. The parameter configuration information used for uplink data transmission includes at least one of the following information: configuration information of a time-frequency resource, configuration information of a pilot parameter, a non-orthogonal transmission parameter, a modulation and coding scheme (MCS), and a power control parameter. The configuration information of the time-frequency resource is used to determine a time-frequency resource for uplink data transmission, and the configuration information of the pilot parameter is used to determine a parameter for generating a pilot. The configuration information of the pilot parameter includes a number of an antenna port in which the pilot is located, and/or a parameter used to generate a pilot sequence, and/or a parameter indicating a time-frequency resource occupied by the pilot. The non-orthogonal transmission parameter includes at least one of the following parameters: a signature used for non-orthogonal transmission, a codebook, a parameter for determining an interleaving manner, a parameter for determining a scrambling manner, and a spread spectrum sequence.

In an embodiment, the network device 200 may send a physical downlink shared channel (PDSCH) carrying a feedback signal and downlink control information (DCI) for scheduling the PDSCH. In an embodiment, the network device 200 may determine a random access-radio network temporary identifier (RA-RNTI) based on the time-frequency resource occupied by the preamble signal corresponding to the feedback signal, and then scramble, by using the RA-RNTI, a cyclic redundancy check (CRC) of DCI used for scheduling the PDSCH.

In another embodiment, the network device 200 may send DCI, and the DCI carries various information carried in the feedback signal described above.

For a sent preamble signal, for example, a preamble signal 1, the UE 100 receives, within a time range, a feedback signal corresponding to the preamble signal 1, and extracts a TA from the feedback signal. For example, if a sequence number of a preamble sequence included in a feedback signal received by the UE 100 matches a sequence number of a preamble sequence of the preamble signal 1 sent by the UE 100, the UE 100 considers that the feedback signal is the feedback signal for the preamble signal 1, and further extracts, from the feedback signal, the TA corresponding to the preamble signal 1. A time range for receiving the feedback signal of the preamble signal may be specified in a communications protocol, or may be configured by the network device 200. A method for obtaining, by the UE 100, a TA corresponding to another preamble signal is similar to a method for obtaining the TA of the preamble signal 1, and details are not described herein again.

In an embodiment, the UE 100 collects N TA values (N>=2) within a sliding time window. For example, if a current time unit is n, the UE 100 collects TAs corresponding to preamble signals sent in T time units from n−T+1 to n, where the time unit may be a timeslot, a subframe, or another time granularity. A length of the sliding time window may be configured by the network device 200, may be specified in a communications protocol, or may be autonomously determined by the UE 100. This is not limited in the application.

Operation S106. The UE 100 determines a valid TA from the received multiple TAs.

After receiving the N TAs, the UE 100 determines valid TAs in the N TAs, and assumes that preamble signals corresponding to these TAs do not collide.

There are multiple methods for determining valid TA values in TA values. For example:

Method a: If a maximum difference between every two of the N TAs is less than or equal to a preset first threshold, it is determined that the N TAs are all valid TAs.

Method b: M1 largest values and M2 smallest values of the N TA values are removed, to obtain an average value of remaining TA values. If a difference between a TA and the average value is less than a preset second threshold, it is determined that the TA value is a valid TA value, where M1>=0, M2>=0.

It should be noted that other methods may also be used to determine the valid TA values in the N TA values. This is not limited in the application.

When the method a is used to determine the valid TAs, the UE stops sending the preamble signal only when the N consecutively obtained TAs are all valid TAs; otherwise, the UE continues to send the preamble signal.

If none of the N TAs collected in the sliding time window is a valid TA, the UE 100 may continue to send the preamble signal by using the method described above, until the UE 100 can determine at least one valid TA.

Operation S108. The UE 100 determines, based on a feedback signal carrying the valid TA or a preamble signal corresponding to the valid TA, a parameter used for uplink transmission, and sends uplink data according to the determined parameter.

The UE 100 may determine one valid TA value from the N TA values, or may determine a plurality of valid TA values. The UE 100 considers that a preamble signal corresponding to a valid TA value does not collide, a probability that an uplink transmission parameter corresponding to the preamble signal is used by another UE at the same time is low, and a probability of collision with another UE when the uplink data is sent by using the uplink transmission parameter corresponding to the preamble signal is low. Therefore, a probability that the network device successfully decodes the uplink data is increased.

In an embodiment, the UE 100 may determine the uplink transmission parameter based on the parameter configuration information that is used for the uplink data transmission and that is carried in the feedback signal carrying the valid TA.

In another embodiment, the UE 100 determines the uplink transmission parameter based on the time-frequency resource occupied by the feedback signal carrying the valid TA and a sequence number or an index of a preamble sequence of the preamble signal corresponding to the valid TA. In an embodiment, a plurality of groups of uplink transmission parameters are predefined, and each group of uplink transmission parameters corresponds to one time-frequency resource and one preamble sequence that are used to send a feedback signal. For example, a number of an uplink transmission parameter group is equal to f (a time-frequency resource occupied by a feedback signal, a sequence number of a preamble sequence), where f( ) is a preset function. The foregoing correspondence and the predefined plurality of groups of uplink transmission parameters may be specified in a communications protocol, or may be configured by the network device 200 for the UE 100.

In another embodiment, the UE 100 determines the uplink transmission parameter based on the time-frequency resource occupied by the preamble signal corresponding to the valid TA and a sequence number of a preamble sequence of the preamble signal. In an embodiment, a plurality of groups of uplink transmission parameters are predefined, and each group of uplink transmission parameters corresponds to one time-frequency resource and one preamble sequence that are used to send the preamble signal. For example, a number of the uplink transmission parameter group is equal to g (a time-frequency resource used to send a preamble signal, a sequence number of the preamble sequence), where g( ) is a preset function. The foregoing correspondence and the predefined plurality of groups of uplink transmission parameters may be specified in a communications protocol, or may be configured by the network device 200 for the UE 100.

It should be noted that a group of uplink transmission parameters includes at least one of the following parameters: a time-frequency resource, a pilot parameter, an MCS, a power control parameter, and a non-orthogonal transmission parameter.

If there are X valid TAs in the N TAs, the UE 100 may transmit the uplink data by using Y groups of uplink transmission parameters corresponding to Y TAs in the X valid TAs, where X is greater than or equal to 2, and Y is less than or equal to X. In an embodiment, the UE 100 may transmit Y different pieces of data by using the Y groups of uplink transmission parameters, and may transmit one piece of data Y times by using the Y groups of uplink transmission parameters.

It may be understood that operation S100 does not need to be performed each time uplink transmission is performed. For example, when the preamble configuration information received by the UE in operation S100 is always valid until the network device sends the preamble configuration information next time, that is, the preamble configuration information is valid within a time period in which the preamble configuration information is valid, the UE may perform operations S102 to S108 for a plurality of times. In another embodiment, the preamble configuration information in operation S100 is not sent by the network device 200, but is specified by a communications protocol.

Figure 6:
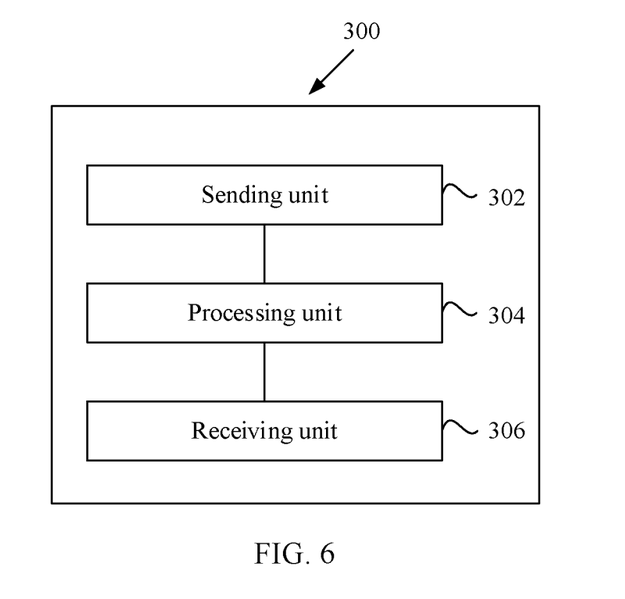
FIG. 6 is a schematic structural diagram of another user equipment according to an embodiment of the application.

The application provides user equipment 300, which may be configured to perform the methods provided in the foregoing embodiments. A structure of the user equipment 300 is shown in FIG. 6, and the user equipment 300 includes a sending unit 302, a processing unit 304, and a receiving unit 306.

The sending unit 302 is configured to send a plurality of different preamble signals to a network device.

The receiving unit 306 is configured to receive a feedback signal of the network device in response to the plurality of preamble signals, where the feedback signal in response to each preamble signal carries a TA.

The processing unit 304 is configured to determine a valid TA from the plurality of received TAs; further configured to determine, based on the feedback signal carrying the valid TA or the preamble signal corresponding to the valid TA, a parameter used for uplink transmission; and further configured to process uplink data based on the parameter to obtain an uplink signal.

The sending unit 302 is further configured to send the uplink signal.

In an embodiment, the feedback signal of each preamble signal further carries parameter configuration information used for uplink transmission. Correspondingly, the processing unit 304 determines the parameter based on the parameter configuration information carried in the feedback signal carrying the valid TA.

In another embodiment, the processing unit 304 determines the parameter based on a time-frequency resource occupied by the feedback signal carrying the valid TA and a sequence number or an index of a preamble sequence of the preamble signal corresponding to the valid TA.

In still another embodiment, the processing unit 304 determines the parameter based on a time-frequency resource of the preamble signal corresponding to the valid TA and a sequence number of a preamble sequence.

For other details of the user equipment 300, refer to corresponding descriptions in the foregoing embodiments. Details are not described herein again.

The application further provides user equipment. As shown in FIG. 2, the user equipment includes a transceiver 101, a memory 103, and a processor 102. The memory 103 is configured to store a computer program. The processor 102 executes the computer program, and controls components such as the transceiver 101 to implement the uplink transmission method on the user equipment side in any one of the foregoing method embodiments. Specifically, the transceiver 101 implements functions of the sending unit 302 and the receiving unit 306 in the foregoing embodiment, and the processor 102 implements functions of the processing unit 304 in the foregoing embodiment. In another embodiment, the transceiver 101 may be replaced with a transmitter and a receiver. The transmitter is configured to implement a function of the sending unit 302 in the foregoing embodiment, and the receiver implements a function of the receiving unit 306 in the foregoing embodiment.

In at least one embodiment, there is at least one processor, configured to execute an executable instruction (e.g., a computer program) stored in the memory. Optionally, the memory may be further integrated in the processor.

An embodiment of the application provides a chip. The chip is configured to support UE in implementing the uplink transmission function in the embodiments of the application, for example, sending or processing related data and/or information in the foregoing method. The chip is used in a chip system, and the chip system may include a chip, or may include a chip and another discrete device. When a chip in the UE implements the foregoing uplink transmission method, the chip includes a processing unit and a communications unit. The processing unit may be, for example, a processor, and the communications unit may be, for example, an input/output interface, a pin, a circuit, or the like. The processing unit performs all or some actions performed by the processing unit of the user equipment in the embodiments of the application, and the communications unit may perform corresponding actions performed by the receiving unit and the sending unit of the user equipment in the embodiments of the application. For example, when the receiving unit of the user equipment receives a radio frequency signal, the communications unit receives a baseband signal corresponding to the radio frequency signal; when the sending unit of the user equipment sends a radio frequency signal, the communications unit sends a baseband signal corresponding to the radio frequency signal. In another embodiment, the user equipment in the application may be a chip. In other words, a processing module of the user equipment is a processing unit of the chip, and a receiving module and a sending module of the user equipment are the communications unit of the chip.

The application further provides a storage medium. The storage medium is configured to store a computer program, and the computer program is used to implement the uplink transmission method on the user equipment side in the foregoing method embodiments.

In at least one embodiment, the processor may be a central processing unit (CPU), or may be another general-purpose processor, a digital signal processor (DSP), an application-specific integrated circuit (ASIC), or the like. The general-purpose processor may be a microprocessor, or may be any conventional processor or the like. Operations of the methods disclosed with reference to the application may be directly performed and accomplished by using a hardware processor, or may be performed and accomplished by using a combination of hardware and software modules in the processor.

All or some of the operations of the method embodiment may be implemented by a program instructing related hardware. The foregoing program may be stored in a readable memory. When the program is executed, the operations of the foregoing method embodiments are performed. The foregoing memory (e.g., storage medium) includes: a read-only memory (ROM), a RAM, a flash memory, a hard disk, a solid state disk, a magnetic tape, a floppy disk, an optical disc, and any combination thereof.

The invention claimed is:

1. An uplink transmission method, comprising:
sending, by a user equipment (UE), a plurality of preamble signals to a network device;
receiving, by the UE, a feedback signal of the network device in response to the plurality of preamble signals, wherein the feedback signal in response to each preamble signal carries a plurality of timing advances (TA)s;
determining, by the UE, a valid TA from the plurality of received TAs collected within a predetermined sliding time window, including:

if a maximum difference between every two of N TAs, from the plurality of received TAs, is less than or equal to a preset first threshold, determining that the N TAs are all valid TAs, removing M1 largest values and M2 smallest values of the N TA values to obtain an average value of remaining TA values, wherein if a difference between a TA and the average value is less than a preset second threshold, determining that the TA value is a valid TA value, wherein M1>0, M2>0;

determining, by the UE, a parameter used for uplink transmission based on a feedback signal carrying the valid TA or a preamble signal corresponding to the valid TA; and sending, by the UE, uplink data according to the parameter.

2. The method according to claim 1, wherein preamble sequences of at least two preamble signals in the plurality of preamble signals are different.

3. The method according to claim 1, wherein at least two preamble signals in the plurality of preamble signals occupy different time domain resources, different frequency domain resources, or different time domain resources and different frequency domain resources.

4. The method according to claim 1, wherein the feedback signal in response to each preamble signal carries a parameter configuration information used for the uplink transmission;

wherein the determining the parameter used for the uplink transmission comprises:

determining, by the UE, the parameter based on the parameter configuration information carried in the feedback signal carrying the valid TA.

5. The method according to claim 1, wherein the determining the parameter used for the uplink transmission comprises:

determining the parameter based on a time-frequency resource occupied by the feedback signal carrying the valid TA and a sequence number of a preamble sequence of the preamble signal corresponding to the valid TA.

6. The method according to claim 1, wherein determining the parameter used for the uplink transmission based on the preamble signal corresponding to the valid TA comprises:

determining the parameter based on a sequence number of a preamble sequence of the preamble signal corresponding to the valid TA and a time-frequency resource occupied by the preamble signal corresponding to the valid TA.

7. The method according to claim 1, wherein the parameter comprises at least one of the following parameters: a time-frequency resource, a pilot parameter, a non-orthogonal transmission parameter, a power control parameter, and a modulation and coding scheme MCS.

8. A user equipment, comprising:
a sending unit configured to send a plurality of preamble signals to a network device;
a receiving unit, configured to receive a feedback signal of the network device in response to the plurality of preamble signals, wherein the feedback signal in response to each preamble signal carries a plurality of timing advances (TA)s;
a processing unit configured to:
determine a valid TA from the plurality of received TAs collected within a predetermined sliding time window, wherein if a maximum difference between every two of N TAs, from the plurality of received TAs, is less than or equal to a preset first threshold, determining that the N TAs are all valid TAs, wherein M1 largest values and M2 smallest values of the N TA values are removed to obtain an average value of remaining TA values, wherein if a difference between a TA and the average value is less than a preset second threshold, determining that the TA value is a valid TA value, wherein M1>0, M2>0;

determine a parameter used for uplink transmission, based on a feedback signal carrying the valid TA or a preamble signal corresponding to the valid TA; and process uplink data based on the parameter to obtain an uplink signal; and wherein the sending unit is configured to send the uplink signal.

9. The user equipment according to claim 8, wherein preamble sequences of at least two preamble signals in the plurality of preamble signals are different.

10. The user equipment according to claim 8, wherein at least two preamble signals in the plurality of preamble signals occupy different time domain resources, different frequency domain resources, or different time domain resources and different frequency domain resources.

11. The user equipment according to claim 8, wherein the feedback signal in response to each preamble signal carries a parameter configuration information used for the uplink transmission; and the processing unit is configured to determine the parameter based on the parameter configuration information carried in the feedback signal carrying the valid TA.

12. The user equipment according to claim 8, wherein the processing unit is configured to determine the parameter based on a time-frequency resource occupied by the feedback signal carrying the valid TA and a sequence number of a preamble sequence of the preamble signal corresponding to the valid TA.

13. The user equipment according to claim 8, wherein the processing unit is configured to determine the parameter based on a time-frequency resource of the preamble signal corresponding to the valid TA and a sequence number of a preamble sequence of the preamble signal corresponding to the valid TA.

14. The user equipment according to claim 8, wherein the parameter comprises at least one of the following parameters: a time-frequency resource, a pilot parameter, a non-orthogonal transmission parameter, a power control parameter, and a modulation and coding scheme MCS.

15. A non-transitory machine readable medium comprising instructions that cause a data processing system to perform an uplink transmission method comprising:

sending a plurality of preamble signals to a network device;

receiving a feedback signal of the network device in response to the plurality of preamble signals, wherein the feedback signal in response to each preamble signal carries a plurality of timing advances (TA)s;

determining a valid TA from the plurality of received TAs collected within a predetermined sliding time window, including:

if a maximum difference between every two of N TAs, from the plurality of received TAs, is less than or equal to a preset first threshold, determining that the N TAs are all valid TAs, removing M1 largest values and M2 smallest values of the N TA values to obtain an average value of remaining TA values, wherein if a difference between a TA and the average value is less than a preset second threshold, determining that the TA value is a valid TA value, wherein M1>0, M2>0;

determining a parameter used for uplink transmission based on a feedback signal carrying the valid TA or a preamble signal corresponding to the valid TA; and sending uplink data according to the parameter.

16. The non-transitory machine readable medium according to claim 15, wherein preamble sequences of at least two preamble signals in the plurality of preamble signals are different.

17. The non-transitory machine readable medium according to claim 15, wherein at least two preamble signals in the plurality of preamble signals occupy different time domain resources, different frequency domain resources, or different time domain resources and different frequency domain resources.

18. The non-transitory machine readable medium according to claim 15, wherein the feedback signal in response to each preamble signal carries a parameter configuration information used for the uplink transmission;

wherein the determining the parameter used for the uplink transmission comprises:

determining the parameter based on the parameter configuration information carried in the feedback signal carrying the valid TA.

19. The non-transitory machine readable medium according to claim 15, wherein the determining the parameter used for the uplink transmission comprises:

determining the parameter based on a time-frequency resource occupied by the feedback signal carrying the valid TA and a sequence number of a preamble sequence of the preamble signal corresponding to the valid TA.

20. The non-transitory machine readable medium according to claim 15, wherein determining the parameter used for the uplink transmission based on the preamble signal corresponding to the valid TA comprises:

determining the parameter based on a sequence number of a preamble sequence of the preamble signal corresponding to the valid TA and a time-frequency resource occupied by the preamble signal corresponding to the valid TA.

* * * * *